United States Patent [19]

Merel

[11] Patent Number: 6,006,194
[45] Date of Patent: Dec. 21, 1999

[54] COMPUTER-IMPLEMENTED SYSTEM FOR CONTROLLING RESOURCES AND POLICIES

[76] Inventor: Peter A. Merel, 2352 Wilbur Ave., San Diego, Calif. 92109

[21] Appl. No.: 08/942,176

[22] Filed: Oct. 1, 1997

[51] Int. Cl.[6] .................................................. G06F 17/60
[52] U.S. Cl. ..................................... 705/8; 705/12; 705/1
[58] Field of Search ........................................ 705/8, 12, 1

[56] References Cited

U.S. PATENT DOCUMENTS

| | | | |
|---|---|---|---|
| 4,445,116 | 4/1984 | Grow | 340/825.05 |
| 4,766,536 | 8/1988 | Wilson, Jr. et al. | 710/121 |
| 5,093,794 | 3/1992 | Howie et al. | 364/468.06 |
| 5,394,324 | 2/1995 | Clearwater | 705/8 |
| 5,606,602 | 2/1997 | Johnson | 379/115 |
| 5,640,569 | 6/1997 | Miller et al. | 710/241 |

OTHER PUBLICATIONS

Wayner, P., BYTE, vol. 15, No. 4, pages 252–258, "Time and money (distributed operating system, Spawn)", Apr. 1, 1990.

Microsoft Press Computer Dictionary, Third Edition, page 470, 1997.

Heinlein, Robert A., Expanded Universe, Ace Books, 1980.

Printout: Published on the Internet prior to Oct. 1, 1996. Title unknown, Author unknown.

*Primary Examiner*—James P. Trammell
*Assistant Examiner*—Nicholas Rosen
*Attorney, Agent, or Firm*—John L. Rogitz

[57] ABSTRACT

A computer-implemented system that can be implemented in human and machine societies to control resources, services, and policy includes issuing tokens to originators in exchange for commissions to be performed by the originators. A commission can be a particular function in the society or it can represent a resource that an originator will make available to the society in exchange for the tokens. The originators may exchange their tokens for services performed by other participants in the society, in which case the performing participant obtains possession of the exchanged tokens. Auctions can be periodically declared to settle a point of policy, such as allocating one of the society's resources. The participants of the society may bid tokens (both as originators and possessors of tokens) in favor of one of several possible auction preferences. At the end of the term of the auction, tokens that have been bid in the auction are recycled to their respective originators, regardless of the who (originator or possessor) bid the tokens.

6 Claims, 5 Drawing Sheets

COMPUTER-IMPLEMENTED SYSTEM FOR CONTROLLING RESOURCES AND POLICIES

FIELD OF THE INVENTION

The present invention relates generally to resource and policy allocation, and more particularly to systems and methods for allocating resources and policies among humans and/or computers.

BACKGROUND

Present socio-economic systems are based on two general forms of representation. The most popular economic system, capitalism, is based on representative pricing that seeks to efficiently allocate scarce resources. And, among the developed countries, the most popular political form is the republic, also known as representative democracy, which seeks to allocate political control through elected representatives.

First focussing on economic forms to understand one of the motivations of the present invention, history has repeatedly taught that market-based allocation of resources results in more productive use of resources than does centrally-planned resource allocation. Not surprisingly, economies that have embraced market-based principles have in general flourished, and economies that have embraced Leninism or other state-directed resource allocation have in general failed.

Nevertheless, capitalism is characterized by several shortcomings. First, it is possible through contemporary marketing techniques to distort market perceptions, thereby creating demand for potentially inferior products at prices that are higher than perfect capitalism would dictate. In other words, one of the disadvantages of capitalism in practice is that one of Adam Smith's most important assumptions, namely, that market participants have instant access to perfect market information, has been virtually impossible to achieve, thereby causing distortions in the efficient allocation of resources.

Moreover, varying degrees of accuracy and currency of market information for different market participants can result in further market distortions, such as speculation by insiders. These market distortions tend to further disrupt the productive utilization of resources.

Additionally, irrevocability and exclusivity of resource control, whether among private controllers as in capitalism or state controllers as in communism, can result in irresponsible resource allocation. This problem is exacerbated in communism, which typically exists in a totalitarian political environment that is unresponsive to the demands of market participants. However, the problem remains, although in a less severe form, in capitalism. This is because capitalism typically exists in a political environment that, while comparatively responsive to its citizens, is loosely coupled to the free market and thus relatively sluggish and ineffectual in dealing with irresponsible resource controllers. Indeed, in a representative system, only governments and lending institutions are able to create tokens of exchange, and many worthy endeavors consequently can be cash-starved while undeserving endeavors are over-capitalized due to social preferences peculiar to political and economic representatives.

Still further, modern economic systems, as mentioned above, are based on the premise of resource scarcity. Resource scarcity, however, is not always an economic fact of life. For example, so-called nanotechnology (in one conception, the digital replication, molecule by molecule, of physical objects) has been postulated, a concept spawned by the ever-increasing capabilities and capacities of digital computers. Indeed, although digital nanotechnology may not be imminent, the economic principles highlighted by the prospect of nanotechnology already apply to many forms of digital media. Should nanotechnology ever become a reality as presently envisioned, resource scarcity and, hence, the underpinning of contemporary economic systems, could cease to be problematic. Stated differently, the entire basis of contemporary economic systems the allocation of scarce resources—is undermined by the existence of digital media and might evaporate entirely in the presence of future technologies. Accordingly, the present invention is premised on the evaluation of opportunity instead of the evaluation of scarcity.

Next focussing on contemporary political forms to understand the motivation for the present invention, as stated above in most advanced countries democratic will is exercised through elected representatives. Elected representatives, however, generally advance the causes of their parties, not necessarily those of the electorate, because party support is necessary to be elected in the first place and marketing techniques can to a large extent obviate public dissatisfaction with this. When the goals of a political party become oriented toward preservation of party power, they can diverge from the basic goal of popular government, namely, the implementation of the will of the majority within constricts that ensure the protection of the minority.

Direct representation, however, has heretofore not been feasible. It simply has not been practical to obtain the individual advice and consent of each and every citizen of a polis to resolve every political matter, and for this reason representative democracy has been regarded by some (although not by all, including not by Plato) to be the next best thing to a true democracy in which every political matter is put to a popular vote.

As recognized by the present invention, however, with the advent and likely progress of computer technology, direct representation can indeed be practicable and feasible. Moreover, the present invention recognizes that more closely coupling a market-based economic system with a direct representation political system can alleviate if not eliminate the above-noted shortcomings of contemporary economic and political forms. As further recognized by the present invention, such a coupling can be achieved without necessarily displacing more traditional socioeconomic forms in a manner that would not have been feasible to implement prior to the advent of digital computers and communications. As still further understood by the present invention, such an effective socio-economic form, properly scaled, can be useful whether the individual members of the society are individual people, or corporate groups, or nations, or indeed whether the individual members are humans or automata.

Accordingly, it is an object of the present invention to provide a system and method for allocating resources in a society and for distributing political control among members of a society. Another object of the present invention is to provide a system and method for allocating resources and administering policy in a computer network. Still another object of the present invention is to provide a socioeconomic system in which control is decentralized and in which capital and authority are directly originated by members of the society. Yet another object of the present invention is to provide a socioeconomic system in which resource ownership and policy determination are united in a single market-based mechanism.

SUMMARY OF THE INVENTION

A socioeconomic method is disclosed for allocating resources, services, and political control in a society having participants. The method includes identifying plural officers, and issuing plural tokens to each officer. Accordingly, each officer is an original officer with respect to the tokens issued to the officer. According to the present invention, each token is identified with its respective original officer.

The method contemplates performing one or more services for at least one served officer, under the direction of a serving officer. In exchange for the performing step, possession of one or more tokens is transferred from the served officer to the serving officer. Moreover, the socioeconomic method includes defining at least one auction having at least one possible preference, with each preference representing a result and with one or more officers bidding one or more of their respective tokens for the possible preferences of the auction. Thereby, a winning preference is established, and the winning preference is valid for the successive term. Importantly, to assure that the franchise of any officer is not permanently lost, all tokens bid in the auction are recycled to their respective original officers at the end of the bidding and are thus available, for the next term, to the officers who were originally issued the tokens.

The preferred method includes defining plural commissions, wherein the issuing step is in exchange for the original officers agreeing to undertake respective duties. Moreover, in the preferred embodiment each preference is associated with a respective rank established by the number of tokens bid for and against the preference. The preferences are ranked relative to each other based on the tokens bid. Still further, for a first one of the possible preferences, each token bid in support of the first preference increases a first rank associated with the first preference, and if desired tokens can be bid against the first preference to decrease the first rank, or tokens can be bid for other preferences. The first preference is the winning preference only when its rank exceeds the ranks of the preferences other than the first preference, and the rank of the winning preference defines the quantum of the auction that is effective for the succeeding term.

A charter of rules is preferably established. Quanta apply and services are performed only when performance and application thereof does not violate the charter. Under some conditions, one or more of the commissions can represent a resource or access to a resource transferred from the respective original officer to the society. As intended by the present invention, the society's commissions are established by auction. In cases where a winning preference of a first auction having a first quantum conflicts with a winning preference of a second auction having a second quantum, the winning preference of the first auction takes precedence over of the winning preference of the second auction only if the first quantum exceeds the second quantum. Preferably, one possible preference of each auction is a null preference.

As also intended by the preferred embodiment, a commission definition auction is undertaken to define one or more commissions, and a subsequent commission recruitment auctions are undertaken to identify candidates for undertaking the one or more commissions. Also, a commission termination auction is undertaken to terminate one or more commissions. Tokens are deactivated when their respective original officers are no longer participants of the society. In one embodiment, the originators and the possessors are computers, and in other embodiments, the originators and the possessors are people or subsocieties of people, or a combination of subsocieties, individual people, and computers.

In another aspect, the present invention is a general purpose computer programmed according to the inventive steps herein to control resources and decision making in an automated society or in a human society. The invention can also be embodied as an article of manufacture—a machine component—that is used by a digital processing apparatus and which tangibly embodies a program of instructions that are executable by the digital processing apparatus to control resources and policy in a single exchange mechanism. This invention is realized in a critical machine component that causes a digital processing apparatus to perform the inventive method steps herein.

With the above in mind, a computer system includes at least one data storage device including at least one computer usable medium having computer usable code means for allocating services, policy, and resources in the computer system. The system may have plural computers, and the computer usable code means include computer readable code means for identifying plural client computers. Also, computer readable code means issue plural tokens to each client computer, each token being identified with its respective client computer. Computer readable code means are provided for performing one or more services for at least one served computer, with at least one serving computer. Additionally, computer readable code means, in response to the performing of one or more services, transfer control of one or more tokens from the served computer to the serving computer.

The system further includes computer readable code means for defining at least one auction having plural possible preferences. Each preference represents a result, and one or more client computers bid one or more of their respective tokens for the possible preferences of the auction to thereby establish a winning preference. Then, computer readable code means cause the recycling of control of all tokens bid in the auction to the respective client computers.

In a still further aspect, a socioeconomic system has a single unit of exchange for expressing a market value for services and for expressing political will among participants of the society. The system includes plural tokens, each being tagged with an identification of an officer. The officer of each token is issued the token in exchange for a commission representing a resource being transferred into the society from the officer or a duty to be performed by the officer.

Computerized means are provided for facilitating the transfer of possession of tokens between a purchasing officer and a serving officer, such that a serving officer may obtain tokens tagged with the identifications of officers other than the serving officer. Also, computerized means facilitate the bidding of tokens at auctions to determine courses of political action including the allocation of resources. As intended by the preferred inventive embodiment, tokens that are bid in an auction are recycled to their respective officers after being bid.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
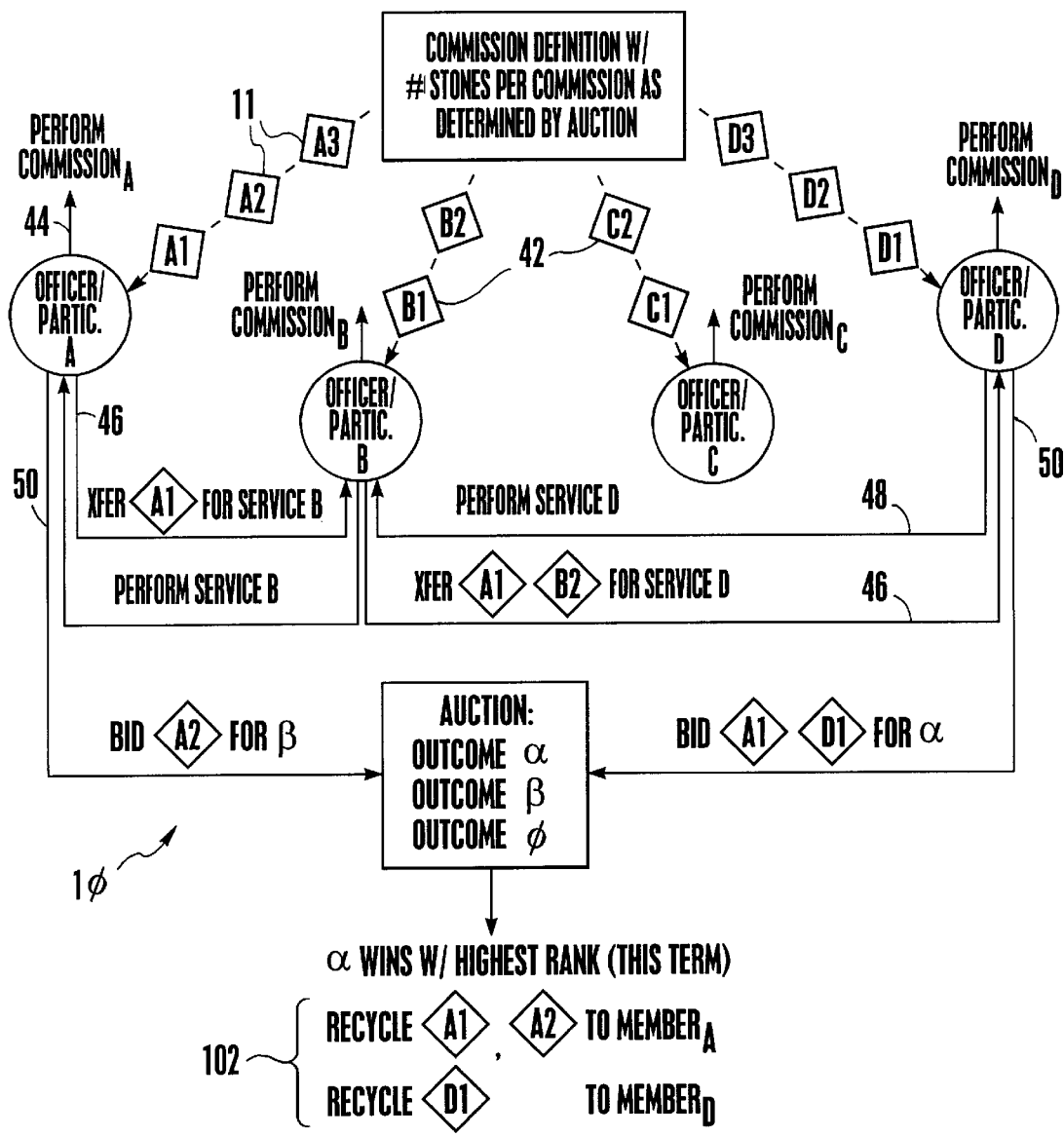
FIG. 1 is a schematic view of a society using the socioeconomic system of the present invention.

Referring initially to FIG. 1, a socioeconomic system is shown for allocating policy, services, and resources among members or participants A–D of a society, generally designated 10, using a single mechanism, referred to herein as "stones" or "tokens" 11 and schematically shown in FIG. 1 as diamonds having alpha-numeric labels. As shown, each participant A–D is an original officer in that each participant A–D receives respective original tokens $A_1, A_2, A_3; B_1, B_2; C_1, C_2;$ and $D_1, D_2, D_3$, in exchange for voluntarily undertaking respective commissions$_{A-D}$. The commissions$_{A-D}$ can be agreements to perform societal duties or the commissions$_{A-D}$ can be agreements to render particular resources, e.g., factories, to the society 10 in exchange for a predetermined number of the tokens 11. While the participants A–D shown in FIG. 1 are all officers of the society 10, in that they all are responsible as respective "clients" in the society 10, not all participants in the society need be officers.

It is to be understood that while for clarity of disclosure only four participants A–D are shown, the society 10 can have a greater number of participants. Also, while only a few tokens 11 are shown in FIG. 1 for clarity, the acceptance of a commission might entail the issuance of millions of tokens 11. It is to be further understood that each participant A–D can be an individual person, or a sub-society of people, or indeed an automated participant, i.e., a computer.

Figure 2:
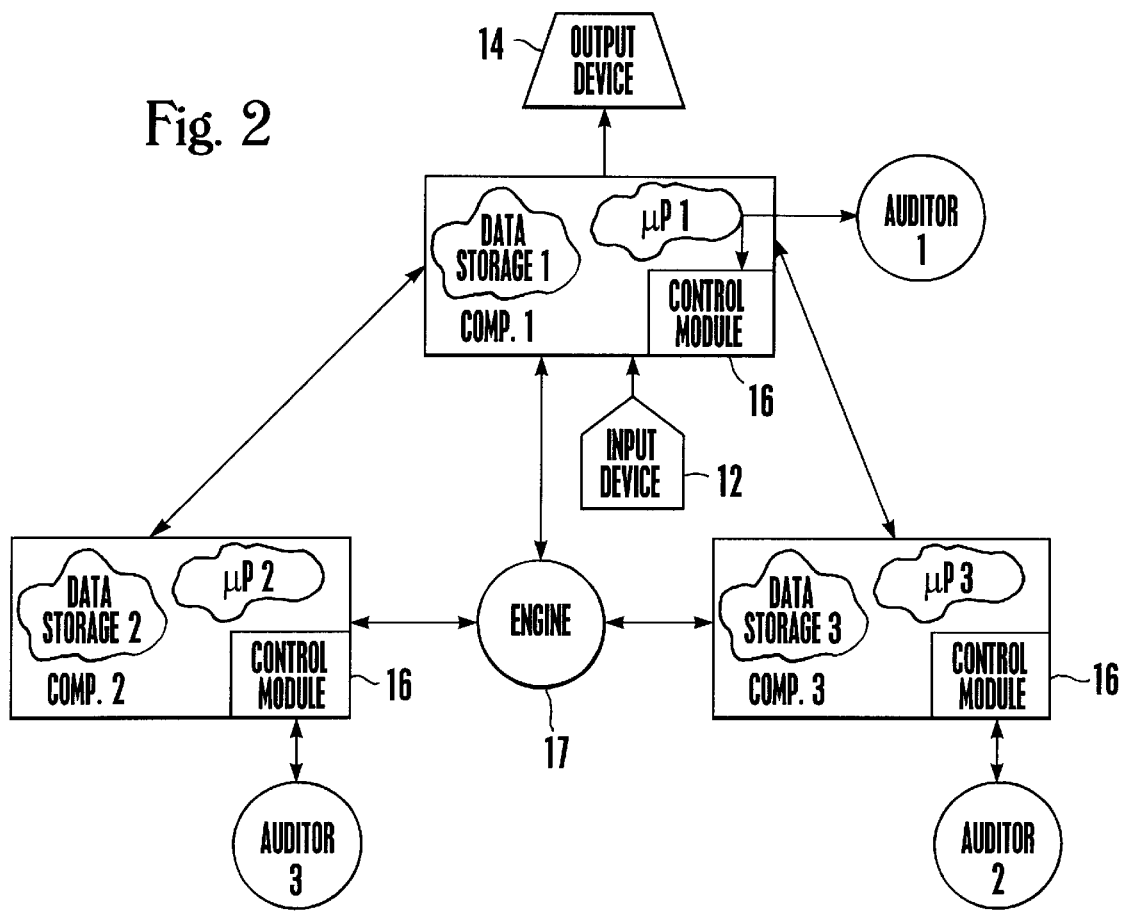
FIG. 2 is a schematic view of a computer network that uses the policy, service, and resource allocation system described herein.

Whether the participants A–D are human or automated, referring briefly to FIG. 2, the society 10 includes plural client computers$_{1-3}$, it being understood that the client computers$_{1-3}$ are either controlled by human officers or are themselves the officers of an automated society. As shown in FIG. 2, the client computers$_{1-3}$ each have a respective data storage space and a respective microprocessor, for example the processor made by Intel Corp. and marketed under the trademark Pentium®. Accordingly, each computer$_{1-3}$ can be a personal computer (PC) or laptop computer made by International Business Machines Corporation (IBM) of Armonk, N.Y. Alternatively, each computer$_{1-3}$ may be any computer, including computers sold under trademarks such as AS400, with accompanying IBM Network Stations. Or, the computer 24 may be a Unix computer, or OS/2 server, or Windows NT server, or IBM RS/6000 250 workstation, or some other computing device.

In accordance with principles known in the art, the computer, includes an input device 12 such as a mouse, keyboard, or trackballs, keypads, touch screens, and voice recognition devices. Further, the computer, includes an output device 14 such as a monitor, printer, communications port, etc. It is to be understood that while only the computer, is shown with input and output devices for simplicity, all of the computers may have such devices. Using the above-described interfaces, the officer associated with a particular client computer can obtain reports on auctions discussed further below, the status of the various preferences in the auctions, conflicts and interdependencies between auctions, notification of new auctions, progress of end-of-term bidding (discussed further below) of auctions, service contract status, token balances, audit reports, resource control and allocation among the other officers, and other information, such as charter provisions. Using the interfaces described above, an officer can bid tokens for and/or against auction preferences, purchase or sell services, propose new auctions and preferences, propose new commissions, create new subsocieties and define the charters thereof, and accept and resign commissions.

As further shown in FIG. 2, the computer, includes a control module 16 which may be executed by the microprocessor, within the computer, as a series of computer-executable instructions. The control module 16 essentially establishes a software-based client controller, and also establishes or has access to a software-implemented auditor$_1$. The instructions executed by the control module 16 may reside, for example, in RAM of the computer$_1$. Likewise, the RAM of the computers$_{2, 3}$ might include all or portions of the control module 16 as shown, and preferably include their own respective auditors$_{2, 3}$. In other words, the control module of the present invention may be distributed among the computers$_{1-3}$.

Figure 3:
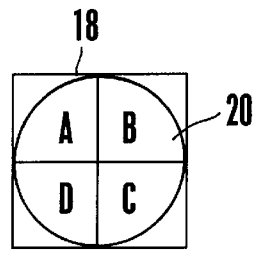
FIG. 3 is a schematic view of a computer program storage product.

Alternatively, the instructions may be contained on a data storage device with a computer readable medium, such as a computer diskette 18 shown in FIG. 3. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C or $C^{++}$ compatible code.

Or, the client controller established by the module 16 can be a so-called "Java bean" or other componentware that is compatible with, e.g., Netscape Navigator™, Microsoft Internet Explorer™, and related wide area computer network browsers. As can be appreciated in reference to FIG. 2, the individual client controllers of the modules 16 communicate with a system engine 17. The engine 17 can reside on a dedicated microprocessor or be distributed among multiple processors, and it can be embodied as a Java-based server or servlet or similar that maintains a database of tokens, officers, accounts, auctions, and services that represent a particular society 10. The engine 17 may include provisions for load sharing, fault tolerance, and scalability, so that many engine processes may be linked together in networks to service growing societies 10. In any case, the client controllers established by the modules 16 manage interfaces between client computers, third party software, and the engine 17 via standard internet communication and database protocols, e.g., TCP and one of RMI, CORBA, Voyager, or similar.

Figure 4:
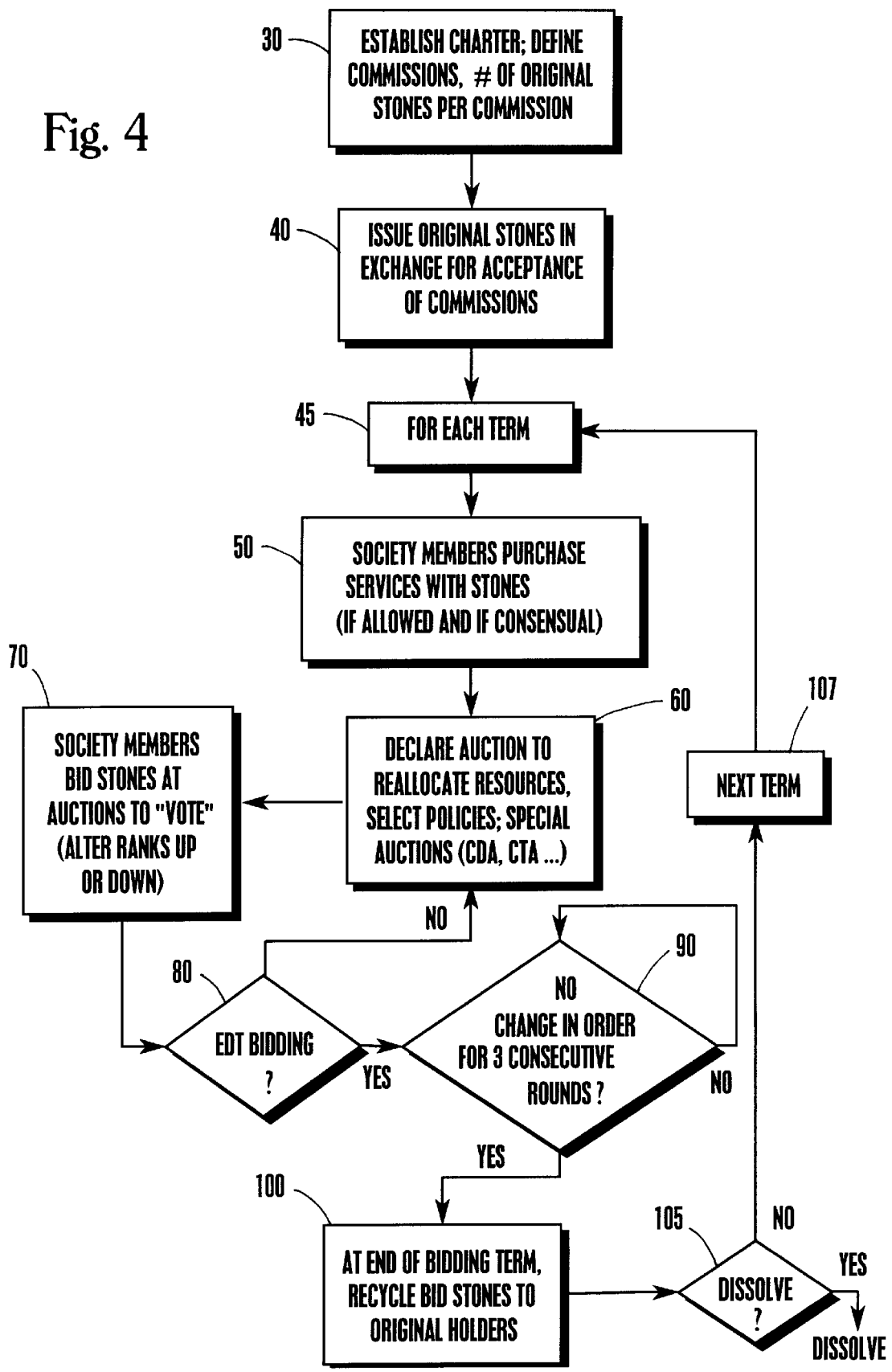
FIG. 4 is a flow chart showing the steps of the present invention in allocating services and resources, as embodied in a human society or as might be embodied in software.

FIG. 4 illustrates the structure of computer instructions of the present invention as embodied in a computer program. Those skilled in the art will appreciate that FIG. 4 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 3 as a combination of program code elements A–D in computer readable form that are embodied in a computer-usable data medium 20, on the computer diskette 18. As mentioned above, however, such media can also be found in semiconductor devices, on magnetic tape, and on optical disks.

As mentioned above, each control module 16 can include a software-implemented auditor that is embodied in, e.g., a Java bean or other componentware and that obtains audit records from one or more engines 17 and cryptographically verifies their integrity, preferably using strong cryptography. The auditors$_{1, 2, 3}$ undertake the audit steps shown below in reference to FIG. 5.

The society 10 includes at least one engine 17, and each officer in the society 10 controls a client computer with associated client computers$_{1, 2, 3}$ with control modules 16 and one or more respective auditors$_{1, 2, 3}$. The society 10 can replicate its engines 17 according to well-known database distribution methodologies.

Referring back to FIG. 1, and now cross-referencing FIG. 4, at block 30 the charter for the society 10 is established by its participants. The charter is essentially a constitution that defines the scope and purpose of the society 10. When the participants A–D are each sub-societies, the charter of the society 10 may also essentially define the relationship between the sub-societies.

Also at block 30, commissions are defined and the number of tokens 11 that are to be issued to a participant for undertaking the commission is established. It is to be understood that as more fully disclosed below, auctions can be held from time to time to define additional commissions.

As mentioned above, commissions can involve societal duties that a participant voluntarily agrees to undertake. Also, a commission might entail the exchange of or access to a resource. For example, a commission might entail the transferring to the society 10 of a resource such as a factory, in exchange for tokens 11. Or, when the participants A–D are computers, a commission might entail the transferring to the society 10 of a computer resource such as one of the electronic storage spaces shown in FIG. 2. Additionally, the charter defines parameters related to auctions, including starting preferences for the initial auctions, rules of law regarding rights and responsibilities in the society, periods/conditions of auction terms and time limits on end of term bidding rounds, and so on. Moreover, a commission can be used to define the rights and responsibilities of a sub-society within the society 10. In such a case, the subsociety is issued tokens 11 of the society 10, and in turn the subsociety can issue its own tokens that are different from the tokens 11 to the members of the subsociety in exchange for intra-subsociety commissions. In the sub-society context, the tokens 11 of the society 10 are treated by the sub-society as resources of the sub-society.

In any case, block 40 indicates, and FIG. 1 shows at transactions 42, that original tokens are issued to the participants A–D in exchange for the participants A–D agreeing to their respective commissions, as indicated at transactions 44 in FIG. 1. For example, participant A has agreed to perform commission$_A$. In exchange, participant A receives three original tokens 11, denoted in FIG. 1 as tokens $A_1, A_2, A_3$. Similarly, participant B has agreed to undertake commission$_B$ for tokens $B_1, B_2$, whereas participant C has agreed to undertake commission$_C$ for tokens $C_1, C_2$. Also, participant D has agreed to undertake commission$_D$ for tokens $D_1, D_2, D_3$.

As intended by the present invention, the tokens 11 preferably are electronic, and each token 11 is cryptographically tagged with the identity of the participant A–D to whom the token 11 was originally issued in exchange for a commission. In the preferred embodiment the exchange of tokens 11 is undertaken electronically. Or, the tokens need only be embodied as electronic records in a central database in, e.g., the engine 17, with tokens being moved within the database between various accounts of the officers of the society 10 as appropriate for original token issue, services rendered, etc. In this way, the officers might not physically possess tokens, but nevertheless "possess" and exclusively control tokens in their accounts by way of cryptographically validated transactions.

In accordance with the present invention, for each auction term as indicated at block 45, at block 50 in FIG. 4 the possession of tokens 11 can be transferred among the participants A–D in exchange for services, with the number of tokens transferred per transaction being determined by market principles, i.e., by human- or computer-based negotiation. The transfer of tokens 11 from a served participant to a serving participant is shown in FIG. 1 by the transactions 46. In exchange, the transactions 48 indicate that the serving participants perform services for the served participants, in the current term or in a later term if desired. An example of a service in a human society 10 is the rendering of a restaurant meal. In contrast, when the participants of the society 10 are computers, a service might entail the use of one of the data stores of the microprocessors$_{1, 2, 3}$ shown in FIG. 2 by a remote client computer$_{2, 3, 1}$. Alternatively, participants might wish to barter one service for another.

Thus, for example, FIG. 1 shows that participant A can transfer possession of token $A_1$ to participant B, in exchange for service$_B$. Under these circumstances, participant B becomes a possessor of token $A_1$, in that participant B now possesses a token 11 that was originally issued to participant A. In turn, participant B purchases service$_D$ from participant D, for two tokens 11. In the example shown, participant B exchanges the tokens $A_1$ and $B_2$ for the services$_D$. Per the present invention, the participants A–D execute economic transactions using market-based principles. It is to be understood that the services rendered must be mutually consensual and must accord with the charter of the society 10, and with any auctions that are in effect.

In addition, the tokens 11 can be bid by the participants A–D in auctions to determine political courses of action in human societies, including how/who shall control particular resources and the goals and relationships the society should maintain. In automated societies, the auctions at which tokens 11 are bid might determine, e.g., which client computer controls which electronic storage space resource.

Accordingly, block 60 in FIG. 4 indicates that one or more of the participants A–D can declare an auction in accordance with the charter established at block 30 to resolve a political dispute, or to transfer control of a particular societal resource from a perhaps underperforming participant to another participant, or to determine how a resource should be shared among multiple users. Also, if desired the below-described commission definition, commission termination, and commission recruitment auctions can be declared at block 60.

At the start of each term, an auction possesses a number of preferences that are either part of the society 10 initial configuration specified in the charter, or that were proposed from scratch by one or more officers in a previous term in accordance with the charter. Or, a new auction can be proposed to be cloned from a prior or existing auction preference, though with the ranks of the cloned preferences starting at zero. New auctions can be created, and new preferences added with ranks starting at zero, during a term. If new preferences are added during an ongoing auction, a condition can be imposed for adding the new preferences or the acceptance of new auctions. For example, for a new preference to be added to an existing auction, a society's charter may require that a predetermined number of tokens, e.g., 10% of the rank of the currently leading preference, be committed to the new preference. These auction activities are created by interactions between the engine 17 and the officers' client computers.

Each preference has a rank determined either by the charter if derived therefrom, or by the auction bidding as described below. The preferences and ranks are maintained in the database of the engine 17. In one preferred embodiment, in each auction the preferences are held to be mutually exclusive. One of the preferences is a null preference which negates the other preferences.

Accordingly, at block 70 the participants A–D bid tokens at the auctions for or against one of a proposed number of possible auction preferences (for clarity, only two non-null preferences $\alpha$, $\beta$ shown in FIG. 1). Also, one of the possible preferences can be the null outcome 0, as mentioned above. Bidding tokens for the null preference indicates that the bidder prefers the auction have no effect.

The above-described bidding is shown in FIG. 1 by bidding transactions 50. In the example shown, participant A has bid one token, $A_2$, for outcome $\beta$, whereas participant D has bid tokens $A_1$ (received from participant A via participant B via service transactions 46) and $D_1$ for outcome $\alpha$. Participants B and C did not bid in the example shown.

As intended by the present invention, a rank is determined for each preference as follows: the rank of each preference equals the number of tokens bid for it, in some embodiments subtracting the number of tokens bid against it, with the preferences here being listed in order of their rank from largest to smallest. Then, the quantum of the auction equals the rank of the highest preference in the auction as measured at the end of the term, it being understood that the quantum of an auction is thus a vector representing the winning preference and its rank at the end of a term. It is to be further understood that the quantum of an auction is constant and in force for the next succeeding term. Thus, the quantum of an auction is unaffected by the bidding during at least the next term, and remains in force until the auction produces a superseding outcome in a later term. Outcome $\alpha$ is the winning outcome in the example shown. Hence the quantum of the auction is $\alpha$ with strength or magnitude of two (2).

Moreover, if desired one or both of the number of tokens bid for a preference and the number of tokens bid against the preference can be used as parameters in an auction formula. For example, the number of stones bid against a winning preference can be subtracted from the number of stones bid for the winning preference, and then the difference divided by the sum of the two could, in some embodiments, be determined to produce a quotient that indicates the strength of the winning preference vis-a-vis other winning but potentially conflicting preferences of other auctions, or the proportions of any allocations that result from the auction. Or, the result of such a formula can be used as a measure of the particular preference's urgency or precedence vis-a-vis those of winning preferences of other auctions.

Per present principles, the bidding in a particular auction may continue indefinitely in bidding rounds, for the entire bidding term. In one preferred embodiment, the society 10 has a single term that is common to all auctions, and at the end of the term, end of term bidding can be declared, if desired. As discussed below, the bidding ends when the rankings of the preferences of the society's various auctions have not changed for three successive bidding rounds during end of term bidding. Then, a new term is declared, with the leading preferences of the various auctions of the prior term having effect in the new term. The duration of the term may be defined by a fixed time period or the satisfaction of some condition defined in the charter.

Alternatively, the bidding may cease before the end of the term or after a predetermined time period. In any case, tokens 11 that are bid in an auction are suspended from further use until the end of the term; they can neither be bid in another auction, nor used to procure services from other participants of the society 10.

From block 70, the process moves to decision diamond 80 to determine whether end of term (EOT) bidding has commenced. For example, at a predetermined time from the chronological end of the bidding term, EOT bidding can be declared. The purpose of EOT bidding is to reduce the likelihood of one or more officers attempting to "steal" an auction by withholding their bids until just prior to the end of the bidding term, and then "flooding" a particular auction with tokens bid for one of the preferences.

As intended by the present invention, EOT bidding consists of EOT bidding rounds of limited time duration or some other conditions defined in the charter of the society 10. When EOT bidding commences, the process moves to decision diamond 90 to determine whether, for three consecutive EOT bidding rounds, any change has been effected by the bidding in the order of preferences in any auction in the society 10. EOT bidding continues in rounds, until the condition of no change for three successive EOT bidding rounds has been satisfied, at which point the bidding is terminated and the process moves to block 100.

Importantly to the present invention, as indicated at block 100 in FIG. 4 and as shown at state 102 in FIG. 1, after the bidding term of an auction has elapsed, tokens 11 are recycled, but not to the bidders (i.e., previous possessors) of the tokens 11. Rather, after the bidding term the tokens 11 are recycled back to the respective officers who were originally issued the tokens in exchange for a commission. Thus, in the example shown, tokens $A_1$ and $A_2$, being tagged with the identification of participant A, are recycled back to participant A. On the other hand, token $D_1$, being original to participant D, is recycled back to participant D. In this way, the participants A–D are always assured of not permanently losing their franchises that are associated with their respective commissions.

At decision diamond 105, it is determined whether to dissolve the society 10 after a particular auction term. This might happen by means of an auction when, e.g., the society 10 is a temporary, special-purpose super-society in which the participants are societies desiring only a temporary alliance for a particular purpose or by other means specified in the society's charter. If the outcome of decision diamond 105 is positive, the society 10 is dissolved with an effect specified in the society's charter; otherwise, the next term is entered at block 107, and the process loops back to block 45.

As mentioned above, in accordance with the present invention, specialized auctions are held for certain matters and are declared at block 60 and conducted as described above for the general case. For example, a commission definition auction (CDA) can be used to define the duties and conditions under which new officers (individuals, automata, or sub-societies with concomitant resources or abilities) are added to the society 10. The winning preference of the CDA defines the duties and conditions of the new commissions as reflected by the bidding of the participants. Then, in a subsequent term, a number of commission recruitment auctions (CRA) are held, this number being specified in the CDA, having as preferences the nominations of various candidate officers and then bid upon by the officers using their respective client computers. As part of the nomination process, the number of tokens 11 to be created and exchanged for each particular nominee's acceptance of the commission is specified. Such nominations, which are authenticated using the steps of FIG. 5 below, might be required by charter to be seconded by a predetermined number of officers with predetermined qualifications, or to be approved by an entire contextual sub-society or to meet some other condition. Some conditions of nomination are enforced by the engine 17.

In determining the number of tokens 11 to be issued for a commission, market principles preferably are used. In other words, participants might bid against each other for particular commissions, when commissions are defined by auction subsequent to the initial charter; for commissions that are particularly difficult to fill, the society 10 might be forced by market principles to offer a large number of tokens 11 for the undertaking of such commissions.

Once the nominees are voted upon, an invitation is extended to the candidate having the highest rank in the CRA, with the invitation being effective for a fixed period or other condition defined by charter or the CDA. If not accepted within this period or condition, the invitation is canceled. As with the above-mentioned auction communications, the invitations are authenticated using the cryptographic discussed below in reference to FIG. 5.

Additionally, a commission can be terminated as provided for in the respective CDA, or it can be terminated involuntarily (i.e., involuntarily on the part of the commissionee) by a commission termination auction (CTA). The conditions for creating a CTA are specified by charter and in the respective CDA. The conditions can include, e.g., standards of evidence, number and qualification of officers proposing termination, approval by contextual societies, etc. Decommissioning, if the winning preference of the CTA, may involve the cancellation of the stones of the decommissioned officer, revocation of the decommissioned officer's bidding privileges, cancellation of access to resources for the decommissioned officer, and whatever other results are specified in the CDA.

Figure 4A:
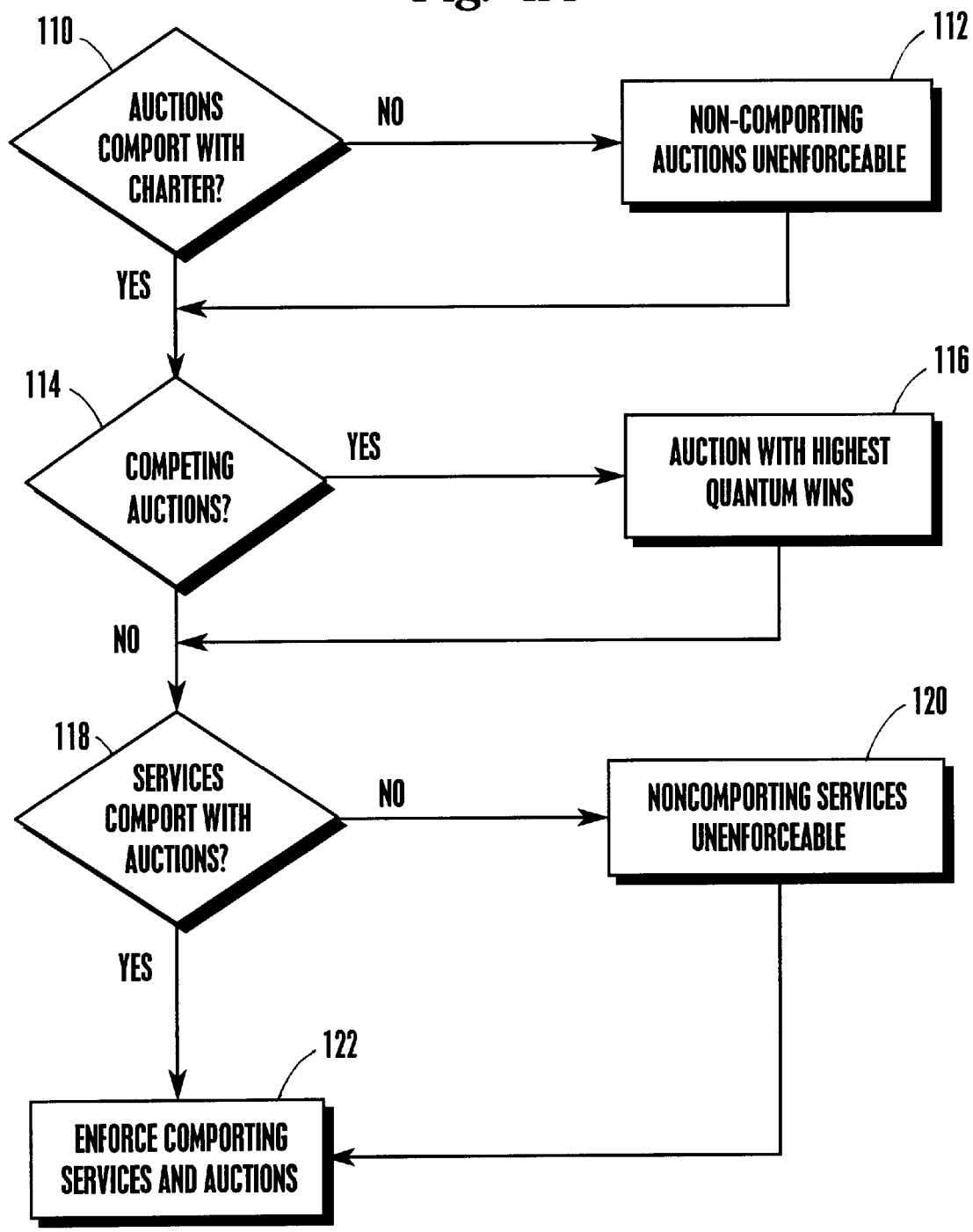
FIG. 4A is a flow chart showing the process for evaluating the effects of a society's auctions on a case-by-case basis.

After the bidding term ends, the effects of a society's auctions and services can be evaluated on a case by case basis as shown in FIG. 4A. FIG. 4A shows that at decision diamond 110, it is determined whether the winning preference of any auction fails to comport with the charter of the society 10. If any auctions fail to comport with the charter, the non-comporting portions are unenforceable, preferably only for the circumstances that rendered them non-comporting at block 112.

From block 112 or decision diamond 110 as appropriate, it is next determined at decision diamond 114 whether another auction has been bid on with a winning preference that is not consistent with a competing auction. If so, the auction having the highest quantum takes precedence at block 116.

Furthermore, the process moves to decision diamond 118 to determine whether any outstanding services fail to comport with one of the winning outcomes of the auctions. The process moves to block 120 to render unenforceable any non-comporting services, and thence to block 122 to enforce (or at least not impede) comporting services and auctions. Remedies, such as the return of tokens to the purchasing officer, for interruption of services by new quanta of auctions, are specified in the service contract and any relevant auctions or articles of the charter of the society 10.

Figure 5:
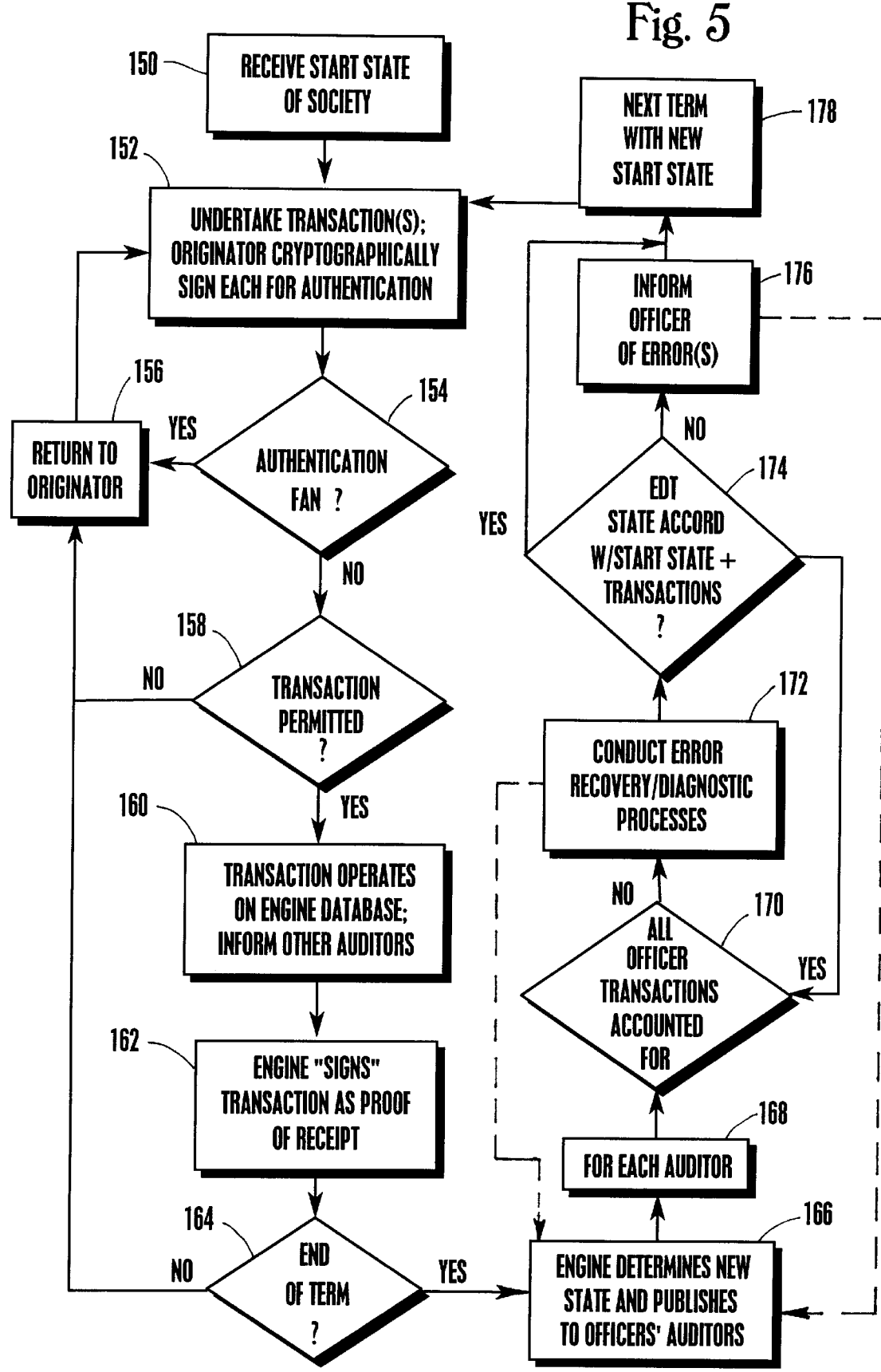
FIG. 5 is a flow chart showing the steps of the authentication model of the present invention.

The above auction bidding and service transactions are verified in accordance with the authentication model shown in FIG. 5. As the skilled artisan will appreciate from the below discussion, the present authentication model is based on strong public key or other strong cryptography principles that provide three functions for promoting the security of the society 10. These functions include the ability to digitally sign messages, including transactions, so that the recipients can rely on the origin and content of messages; the ability to encrypt messages; and the ability to function without any prior secure transmission medium or prior transmission of secrets, so that the strength of the system depends solely on mathematical and physical security issues.

At block 150 in FIG. 5, at the start of the society 10, the initial state of the society 10 is published to all of the auditors$_{1,2,3}$ that are associated with the client computers$_{1,2,3}$ (FIG. 2) of the officers/participants A–D (FIG. 1) (also referred to herein as "SC"). The start state includes information on the number of tokens 11 each SC originally is issued, the commissions of the SCs, and, when begun after the end of one term and before the beginning of the next term, a record of the transactions undertaken during the ended term, the quanta of auctions determined in the previous term, and the amount of tokens in the officers' accounts. Also, the start state includes information necessary to support public key cryptography, i.e., signatures and the public portion of a cryptographic key.

Next, at block 152 transactions are undertaken. These transactions can include any of the transactions mentioned above, e.g., bidding tokens 11 for auction preferences or transferring tokens 11 for services. Each transaction, which may include a time stamp, sender, and origin, is cryptographically signed by the originator(s) for validation using public key cryptography. If desired, the entire transaction message can be encrypted.

At decision diamond 154, it is determined (by either the engine 17 or the auditor of the recipient SC) whether validation of the transaction failed, based on the start state information available to the engine 17 and the auditor(s) of the recipient SC(s). For example, if the wrong validation "signature" is used, or if the originator attempts to transfer possession of more tokens than the originator currently possesses, the validation fails. If the validation fails, the process moves to block 156 to return the message to the originator with the transaction taking no effect, and then the process loops back to block 152.

If it is determined, however, at decision diamond 154 that the transaction is valid, the process continues to decision diamond 158 to determine whether the transaction is permitted by the society's charter and quanta. This determination is preferably made by the engine 17, which possesses information relating to prior audits and to the charter of the society 10. If the determination is to be made by the engine 17, the communication protocol of the society 10 would dictate that all transactions of the society 10 are transmitted through the engine 17. It is to be understood that the determinations made at decision diamonds 154, 158 can be reversed in order or undertaken in parallel.

If the transaction is not permitted, the process moves to block 156 to return the message to the originator with the transaction taking no effect; otherwise, the process moves to block 160, at which the transaction is given effect, such that it operates as appropriate on the database of the engine 17, e.g., bids are accepted at auctions, tokens 11 transferred, services rendered in exchange therefor, etc. Also at block 160, the engine 17 can inform, if such is desired, the other auditors in the society 10 of the transaction.

Moving from block 160 to block 162, the engine 17 cryptographically signs the transaction as proof of receipt using a key that is randomly generated at the start of the term. Then the process moves to block 156 to return the receipt to the originator. Next, at decision diamond 164 it is determined whether the society 10 has reached the end of the term, as indicated by, e.g., either the commencement or completion of end of term bidding.

When the test at decision diamond 164 is positive, the method moves to block 166, wherein the engine 17 determines the end of term (EOT) state of the society 10 and publishes this state to the society's auditors. Block 168 represents that for each auditor, the steps of states 170–178 are executed. More specifically, each auditor undertakes the step at decision diamond 170, wherein it is determined whether all of the transactions for the particular auditor's officer have been accounted for by the engine 17. If not, the auditor may inform the officer of the error at block 172, and error recovery and diagnostic processes are implemented, which can cause the process to loop back to block 166 as indicated by the dashed line. Otherwise, the process moves to decision diamond 174, wherein the EOT state is compared to the start state transmitted at block 150, as it should have been modified by the society's transactions reported at block 160.

If the EOT state does not comport with the previous start state as it should have been modified over the course of the term, the auditor informs the officer of the error at block 176, and error recovery and diagnostic procedures then ensue with the process possibly looping back to block 166 if an error is discovered as indicated by the dashed line. Otherwise, or from decision diamond 174 if the test there was positive, the process moves to block 178 to begin the next term using as a start state the corrected EOT state from the previous term.

When the society 10 is composed of automata, the officers of the society can be the client computers. Also, other simplifications might arise, such as implementing only those auctions defined by charter, such that the process of commissioning is predefined, and not undertaken by auction.

While the particular SYSTEM AND METHOD FOR CONTROLLING RESOURCES AND POLICIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer system including at least one data storage device including at least one computer usable medium having computer usable code means for allocating services and resources in the computer system, the system having plural computers, the computer usable code means having:

computer readable code means for identifying plural client computers;

computer readable code means for issuing plural tokens to each client computer, each token being identified with its respective client computer;

computer readable code means for performing one or more services for at least one served computer, with at least one serving computer;

computer readable code means for, in response to the performing of one or more services, transferring control of one or more tokens from the served computer to the serving computer;

computer readable code means for defining at least one auction having plural predetermined possible preferences, each preference representing a result, one or more client computers bidding one or more of their respective tokens for the possible preferences of the auction to thereby establish a winning preference; and computer readable code means for recycling all tokens bid in the auction to the respective client computers.

2. The computer system of claim 1, further comprising computer readable code means for defining plural commissions, wherein the issuing step is in exchange for the client computers agreeing to undertake respective commissions.

3. The computer system of claim 2, wherein the at least one auction has a term for which the winning one of the resource allocation preferences is to be effective.

4. The computer system of claim 3, wherein the service is undertaking one or more electronic computations or providing access to a computer storage resource.

5. The computer system of claim 4, wherein one or more of the commissions represents access to a computer storage resource or processing mechanism.

6. The computer system of claim 5, wherein when a winning preference of a first auction conflicts with a winning preference of a second auction, the auction having the lowest quantum is ignored.

* * * * *